(12) United States Patent
Tanimoto et al.

(10) Patent No.: US 9,080,035 B2
(45) Date of Patent: Jul. 14, 2015

(54) AQUEOUS FLUOROPOLYMER DISPERSION

(75) Inventors: Kenjiro Tanimoto, Settsu (JP); Junya Iida, Settsu (JP); Takeshi Shimono, Settsu (JP); Takayuki Hirao, Settsu (JP); Nobuhiko Tsuda, Settsu (JP); Taketo Kato, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/008,324

(22) PCT Filed: Mar. 29, 2012

(86) PCT No.: PCT/JP2012/058367
§ 371 (c)(1),
(2), (4) Date: Sep. 27, 2013

(87) PCT Pub. No.: WO2012/133655
PCT Pub. Date: Oct. 4, 2012

(65) Prior Publication Data
US 2014/0031469 A1    Jan. 30, 2014

(30) Foreign Application Priority Data
Mar. 31, 2011  (JP) ................................ 2011-080306

(51) Int. Cl.
| | | |
|---|---|---|
| *C08K 5/17* | (2006.01) | |
| *C09D 7/12* | (2006.01) | |
| *C08K 5/09* | (2006.01) | |
| *C09D 127/18* | (2006.01) | |
| *C09D 5/16* | (2006.01) | |
| *C08K 5/092* | (2006.01) | |

(52) U.S. Cl.
CPC . *C08K 5/175* (2013.01); *C08K 5/09* (2013.01); *C08K 5/092* (2013.01); *C09D 5/1662* (2013.01); *C09D 7/1233* (2013.01); *C09D 127/18* (2013.01)

(58) Field of Classification Search
USPC .................................................. 524/238, 320
See application file for complete search history.

(56) References Cited

U.S. PATENT DOCUMENTS

| | | |
|---|---|---|
| 5,750,606 A | 5/1998 | Miura et al. |
| 2004/0143052 A1 | 7/2004 | Epsch et al. |
| 2004/0171736 A1 | 9/2004 | Dadalas et al. |
| 2008/0221244 A1 | 9/2008 | Sawauchi et al. |
| 2009/0105372 A1 | 4/2009 | Sawauchi et al. |
| 2009/0278092 A1 | 11/2009 | Sawauchi et al. |

FOREIGN PATENT DOCUMENTS

| | | | | |
|---|---|---|---|---|
| CN | 1155289 | A | 7/1997 | |
| CN | 101087814 | A | 12/2007 | |
| CN | 101163724 | A | 4/2008 | |
| CN | 101538394 | A | 9/2009 | |
| JP | 08-151548 | A | 6/1996 | |
| JP | 8-151548 | A | 6/1996 | |
| JP | 10-007863 | * 1/1998 | ............. C08L 27/12 |
| JP | 10-7863 | A | 1/1998 | |
| JP | 10-007863 | A | 1/1998 | |
| JP | 2006-522836 | A | 10/2006 | |
| JP | 2006-523758 | A | 10/2006 | |
| WO | 2006069109 | A1 | 6/2006 | |
| WO | 2006086795 | A1 | 8/2006 | |
| WO | 2006/132368 | A1 | 12/2006 | |
| WO | 2007/026822 | A1 | 3/2007 | |
| WO | 2008/001846 | A1 | 1/2008 | |

OTHER PUBLICATIONS

English Translation of the International Preliminary Report on Patentability and Written Opinion of the International Searching Authority for PCT Appln. No. PCT/JP2012/058367 issued Oct. 8, 2013.

* cited by examiner

*Primary Examiner* — Robert Harlan
(74) *Attorney, Agent, or Firm* — Sughrue Mion, PLLC

(57) ABSTRACT

The present invention provides an aqueous fluoropolymer dispersion that shows favorable dispersion stability and is less likely to have a pH decrease even after storage for a long period of time. The present invention provides an aqueous fluoropolymer dispersion including: a fluoropolymer; a fluorine free surfactant; at least one organic electrolyte selected from the group consisting of hydroxy monocarboxylic acids, hydroxy dicarboxylic acids, tricarboxylic acids, and amino acids; and a fluorine-containing anionic surfactant containing not more than 7 carbon atoms.

14 Claims, No Drawings

AQUEOUS FLUOROPOLYMER DISPERSION

CROSS REFERENCE TO RELATED APPLICATIONS

This application is a National Stage of International Application No. PCT/JP2012/058367, filed on Mar. 29, 2012, which claims priority from Japanese Patent Application No. 2011-080306, filed on Mar. 31, 2011, the contents of all of which are incorporated herein by reference in their entirety.

TECHNICAL FIELD

The present invention relates to an aqueous fluoropolymer dispersion.

BACKGROUND ART

Aqueous fluoropolymer dispersions have been widely used for various applications such as linings of cooking utensils and pipes, or impregnated glass cloths because the dispersions can be formed into films showing excellent chemical stability, non-tackiness, weather resistance and the like, by a method of coating, impregnation, or the like. In such applications, the aqueous fluoropolymer dispersion preferably has a high fluoropolymer concentration. From this standpoint, commonly used dispersions are those obtained by polymerizing fluorine-containing monomers in an aqueous medium in the presence of a fluorine-containing anionic surfactant, and concentrating the resulting polymers. In terms of the cost, however, the fluorine-containing anionic surfactant is preferably removed from the aqueous fluoropolymer dispersion.

Aqueous fluoropolymer dispersions containing only a small amount of a fluorine-containing anionic surfactant, however, have following problems: (1) an increase in the fluoropolymer concentration increases the viscosity of the dispersion, leading to poor handleability; and (2) fluoropolymer particles tend to be agglomerated when subjected to mechanical stress during transport or processing such as film formation, lowering the quality of the aqueous dispersions and of films or impregnates formed therefrom (i.e., problem of mechanical stability). To solve the problems, aqueous fluoropolymer dispersions excellent in dispersion stability even with a low concentration of a fluorine-containing anionic surfactant have been developed (see, for example, Patent Literatures 1 to 3).

Patent Literature 4 discloses addition of an inorganic metal salt, such as potassium sulfate, to an aqueous fluoropolymer dispersion for the purpose of avoiding gelation of the fluoropolymer in the aqueous fluoropolymer dispersion that is standing still.

Patent Literature 5 discloses use of a mixture of a nonionic non-fluorinated surfactant and a non-fluorinated anionic surfactant for the purpose of solving a problem that the stability of a concentrated dispersion system may be lower, under specific conditions, than that of a dispersion system containing a larger amount of a low-molecular fluorinated surfactant. A preferable non-fluorinated anionic surfactant disclosed in Patent Literature 5 is an anionic hydrocarbon surfactant having a sulfonate group.

A aqueous fluoropolymer dispersion obtained by polymerization of fluoromonomers contains a polymerization initiator decomposed during the polymerization reaction, and therefore is commonly acidic with a pH value of about 1.0 to 3.0. Accordingly, the aqueous fluoropolymer dispersion obtained by polymerization is concentrated by a known method to have a higher fluoropolymer concentration and adjusted to be alkaline using an alkali such as ammonium or hydroxide ions, before its use.

CITATION LIST

Patent Literature

Patent Literature 1: WO 2006/132368
Patent Literature 2: WO 2007/026822
Patent Literature 3: WO 2008/001846
Patent Literature 4: JP-T 2006-522836
Patent Literature 5: JP-T 2006-523758

SUMMARY OF INVENTION

Technical Problem

The present inventors found out that a conventional aqueous fluoropolymer dispersion containing only a small amount of a fluorine-containing anionic surfactant has its pH lowered over time. If the pH of the aqueous dispersion is lowered, materials that are deactivated by a low pH cannot be used in the dispersion. Especially, when the aqueous fluoropolymer dispersion is used for electrode materials of batteries or drive components of vehicles which utilize oxidation reduction reactions or neutralization reactions, a pH decrease of the aqueous fluoropolymer dispersion is a serious problem. Even though the pH of the aqueous fluoropolymer dispersion can be adjusted before use, such an operation is disadvantageous from the standpoint of economic efficiency.

In consideration of the state of the art, the present invention aims to provide an aqueous fluoropolymer dispersion that shows favorable dispersion stability and is less likely to have a pH decrease even after storage for a long period of time.

Solution to Problem

As a result of the intensive studies, the present inventors found out that a specific organic electrolyte suppresses a pH decrease of the aqueous fluoropolymer dispersion, thereby completing the present invention.

The present invention relates to an aqueous fluoropolymer dispersion including: a fluoropolymer; a fluorine free surfactant; at least one organic electrolyte selected from the group consisting of hydroxy monocarboxylic acids, hydroxy dicarboxylic acids, tricarboxylic acids, and amino acids; and a fluorine-containing anionic surfactant containing not more than 7 carbon atoms.

The present invention also relates to a coating composition containing the aqueous fluoropolymer dispersion.

The present invention further relates to a binding agent for a battery, containing the aqueous fluoropolymer dispersion.

The present invention still further relates to a method for producing an aqueous fluoropolymer dispersion, including the steps of: (1) emulsion polymerizing a fluoromonomer in an aqueous medium in the presence of a fluorine-containing anionic surfactant containing not more than 7 carbon atoms; (2) removing the fluorine-containing anionic surfactant from the aqueous dispersion resulting from the step (1) by adding a fluorine free surfactant; (3) adding at least one organic electrolyte selected from the group consisting of hydroxy monocarboxylic acids, hydroxy dicarboxylic acids, tricarboxylic acids, and amino acids, to the aqueous dispersion resulting from the step (2); and (4) adjusting the pH of the aqueous dispersion to 8 to 10.

Advantageous Effects of Invention

The aqueous dispersion of the present invention shows favorable dispersion stability and is less likely to have a pH decrease even after storage for a long period of time, so that no operation of adjusting the pH is needed before its use and such an aqueous dispersion can be used for a variety of applications.

DESCRIPTION OF EMBODIMENTS

The aqueous fluoropolymer dispersion of the present invention includes a fluoropolymer, a fluorine free surfactant, a specific organic electrolyte, and a fluorine-containing anionic surfactant containing not more than 7 carbon atoms.

The organic electrolyte is at least one selected from the group consisting of hydroxy monocarboxylic acids, hydroxy dicarboxylic acids, tricarboxylic acids, and amino acids. These each have, in each molecule, at least one carboxyl group and a total of at least two groups selected from carboxyl, hydroxy, and amino groups. Preferably, the organic electrolyte does not contain a fluorine atom and is not a surfactant.

Containing the organic electrolyte, the aqueous fluoropolymer dispersion of the present invention does not have a pH decrease. The reason for a pH decrease of a conventional aqueous fluoropolymer dispersion is not clear. Presumably, the pH is affected by evaporation of ammonia used for neutralization, dissolution of carbon dioxide in the air, decomposition of a residual polymerization initiator, or the like. Surprisingly, a specific organic electrolyte suppresses a pH decrease of aqueous fluoropolymer dispersions.

Examples of the hydroxy monocarboxylic acid include lactic acid, glyceric acid, glycolic acid, and hydroxy butyric acid.

Examples of the hydroxy dicarboxylic acid include malic acid and tartaric acid.

Examples of the tricarboxylic acid include citric acid and isocitric acid.

Examples of the amino acid include glycine.

Particularly, the organic electrolyte is preferably at least one selected from the group consisting of citric acid, isocitric acid, malic acid, glycine, and lactic acid, and is more preferably at least one selected from the group consisting of citric acid, isocitric acid, and lactic acid.

The amount of the organic electrolyte in the aqueous fluoropolymer dispersion of the present invention is preferably, for 1 g of the fluoropolymer, 0.1 to 100 mmol, more preferably 0.1 to 50 mmol, still more preferably 0.1 to 10 mmol, particularly preferably 0.2 to 1.0 mmol, and even more preferably 0.3 to 0.6 mmol. If the amount of the organic electrolyte is too large, the dispersion may be separated into a supernatant phase and a condensed phase during storage. If the amount is too small, the pH of the dispersion may be lowered during storage.

The fluoropolymer is preferably a fluororesin. The fluororesin is not particularly limited as long as it has a definite melting point.

The fluoropolymer has a melting point of preferably 100 to 347° C., and more preferably 150 to 347° C.

The melting point is obtained, for example, by measuring a temperature corresponding to the local maximum value of a thermal melting curve that is obtained using a differential scanning calorimeter (DSC) at a temperature increase rate of 10° C./min.

The fluoropolymer commonly has a particle shape. Hereinafter, such fluoropolymers are referred to as fluoropolymer particles. The fluoropolymer particles have an average particle size of preferably 10 to 400 nm, and more preferably 100 to 350 nm. The average particle size is obtained as follows. A calibration curve is constructed which shows the relation between the transmittance of incident light having a wavelength of 550 nm per unit length through an aqueous dispersion adjusted to have a fluoropolymer concentration of 0.22% by mass and the average particle size obtained in advance by measurements of sizes in a certain direction on a transmission electron photomicrograph. Using the curve, the average particle size was determined from the transmittance.

The fluoropolymer is preferably a homopolymer or copolymer having a repeating unit derived from at least one fluorine-containing ethylenically monomer. The fluoropolymer may be obtained by polymerization only of a fluorine-containing ethylenically monomer, or by polymerization of a fluorine-containing ethylenically monomer and an ethylenically monomer having no fluorine atom.

The fluoropolymer preferably has a repeating unit derived from at least one fluorine-containing ethylenically monomer selected from the group consisting of vinyl fluoride (VF), tetrafluoroethylene (TFE), vinylidene fluoride (VdF), chlorotrifluoroethylene (CTFE), hexafluoropropylene (HFP), hexafluoroisobutene, monomers represented by $CH_2=CZ^1(CF_2)_nZ^2$ (wherein $Z^1$ represents H or F, $Z^2$ represents H, F, or Cl, and n represents an integer of 1 to 10), perfluoro(alkyl vinyl ether) (PAVE) represented by $CF_2=CF-ORf^1$ (wherein $Rf^1$ represents a C1-C8 perfluoro alkyl group), and alkyl perfluoro vinyl ether derivatives represented by $CF_2=CF-O-CH_2-Rf^2$ (wherein $Rf^2$ represents a C1-C5 perfluoro alkyl group).

The fluoropolymer may have a repeating unit derived from an ethylenically monomer having no fluorine atom. In terms of maintenance of the heat resistance, chemical resistance, and the like, the fluoropolymer preferably has a repeating unit derived from an ethylenically monomer containing not more than 5 carbon atoms. Also, the fluoropolymer preferably has at least one fluorine free ethylenically monomer selected from the group consisting of ethylene, propylene, 1-butene, 2-butene, vinyl chloride, vinylidene chloride, and unsaturated carboxylic acid.

The fluoropolymer is preferably at least one selected from the group consisting of polytetrafluoroethylene (PTFE), polychlorotrifluoroethylene (PCTFE), ethylene (Et)/TFE copolymers (ETFE), Et/chlorotrifluoroethylene (CTFE) copolymers, CTFE/TFE copolymers, TFE/HFP copolymers (FEP), TFE/PAVE copolymers (PFA), and polyvinylidenefluoride (PVdF), and is more preferably at least one selected from the group consisting of PCTFE, ETFE, CTFE/TFE copolymers, FEP, and PFA.

The fluoropolymer is still more preferably at least one selected from the group consisting of PTFE and FEP, and is particularly preferably PTFE.

The PTFE is not particularly limited as long as it has non-melt processability. The PTFE may be homo-PTFE, modified PTFE, or PTFE having a core-shell structure.

The modified PTFE refers to a copolymer of TFE and a trace monomer other than TFE, and has non-melt processability.

Examples of the trace monomer include fluoroolefin such as HFP or CTFE; fluoro(alkyl vinyl ether) having an alkyl group including 1 to 5, especially 1 to 3, carbon atoms; fluorodioxole; perfluoro alkyl ethylene; and ω-hydroperfluoroolefin.

In the modified PTFE, the proportion of the trace monomer unit derived from the trace monomer in the entire monomer unit is commonly 0.001 to 1 mol %, preferably 0.005 to 0.5 mol %, and more preferably 0.01 to 0.1 mol %.

Examples of the PAVE include perfluoro(methyl vinyl ether) (PMVE), perfluoro(ethyl vinyl ether) (PEVE), perfluoro(propyl vinyl ether) (PPVE), and perfluoro(butyl vinyl ether). In particular, PMVE, PEVE, or PPVE are more preferable.

In the alkyl perfluoro vinyl ether derivatives, $Rf^2$ is preferably a C1-C3 perfluoro alkyl group. More preferably, the alkyl perfluoro vinyl ether derivative is $CF_2=CF-O-CH_2-CF_2CF_3$.

The FEP is not particularly limited, and is preferably a copolymer including 70 to 99 mol % of a TFE unit and 1 to 30 mol % of a HFP unit. More preferably, the FEP is a copolymer including 80 to 97 mol % of a TFE unit and 3 to 20 mol % of a HFP unit. When the amount of the TFE unit is less than 70 mol %, mechanical properties tend to be lowered. When the amount of the TFE unit is more than 99 mol %, the melting point is too high, leading to reduction in moldability. Also, the FEP is preferably a copolymer including 0.1 to 10 mol % of a monomer unit derived from a monomer copolymerizable with TFE and HFP and 90 to 99.9 mol % of the TFE unit and the HFP unit in total. Examples of the monomer copolymerizable with TFE and HFP include PAVE and alkyl perfluoro vinyl ether derivatives.

Respective monomer contents of the copolymers are calculated by NMR, FT-IR, elemental analysis, or fluorescent X-ray analysis which may be appropriately combined in accordance with the kinds of monomers.

The aqueous fluoropolymer dispersion of the present invention preferably has a solid content concentration of the fluoropolymer of 35 to 75% by mass. The lower limit is more preferably 40% by mass and still more preferably 50% by mass. The upper limit is more preferably 65% by mass. The aqueous fluoropolymer dispersion of the present invention shows high dispersion stability even when containing fluoropolymers at high concentrations.

The solid content concentration of the fluoropolymer can be determined as follows. An amount of about 1 g (X g) of a test sample was placed in an aluminum cup with a diameter of 5 cm. The test sample was dried at 100° C. for one hour and then at 300° C. for one hour. Based on the weight (Z g) of the heating residue, the solid content concentration is calculated using the equation:

$$P = Z/X \times 100(\%).$$

The fluorine free surfactant may be, as long as it includes a compound free from fluorine, a nonionic surfactant, an anionic surfactant, or a combination of a nonionic surfactant and an anionic surfactant. Preferably, the fluorine free surfactant is a fluorine free nonionic surfactant.

Examples of the fluorine free anionic surfactant include alkyl sulfonic acid and its salt, alkyl sulfate and its salt, alkyl sulfosuccinate and its salt, and oxyalkylated sulfonic acid and its salt. Combination use of a nonionic surfactant and an anionic surfactant as the fluorine free surfactant efficiently improves the storage stability of a resulting aqueous dispersion and suppresses the viscosity increase of the dispersion which occurs along with warming of the solution.

The nonionic surfactant is not particularly limited, as long as it includes a nonionic compound free from fluorine (fluorine free nonionic surfactant), and a known surfactant may be used. Examples of the fluorine free nonionic surfactant include: ether nonionic surfactants such as polyoxyethylene alkyl phenyl ether, polyoxyethylene alkyl ether, or polyoxyethylene alkylene alkyl ether; polyoxyethylene derivatives such as ethyleneoxide/propyleneoxide block copolymers; ester nonionic surfactants such as sorbitan fatty acid ester, polyoxyethylene sorbitan fatty acid ester, polyoxyethylene sorbitol fatty acid ester, glycerin fatty acid ester, or polyoxyethylene fatty acid ester; and amine nonionic surfactants such as polyoxyethylene alkyl amine or alkyl alkanolamide.

In the compound included in the nonionic surfactant, a hydrophobic group thereof may be any of an alkylphenol group, a straight alkyl group, and a branched alkyl group. Preferably, the compound is a compound having no benzene ring, such as a compound having no alkylphenol group in the structure.

In the aqueous fluoropolymer dispersion of the present invention, the concentration of the fluorine free surfactant is, based on the solid content mass of the fluoropolymer, preferably 0.1 to 30% by mass, and more preferably 0.2% by mass or more and 10% by mass or less. If the concentration of the fluorine free surfactant is too high, the economic efficiency may be lowered. If the concentration is too low, the dispersion stability of the aqueous fluoropolymer dispersion may be lowered.

Here, the concentration (N) of the fluorine free surfactant is determined as follows. An amount of about 1 g of a test sample is placed in an aluminum cup having a diameter of 5 cm and heated. Based on the heating residue (Y g) resulting from heating at 100° C. for one hour, and the heating residue (Z g) resulting from further heating of the heating residue (Y g) at 300° C. for one hour, the concentration is calculated using the equation:

$$N = [(Y-Z)/Z] \times 100(\%).$$

The aqueous fluoropolymer dispersion of the present invention preferably contains 0.001 to 2000 ppm of a fluorine-containing anionic surfactant based on the solid content mass of the fluoropolymers. The dispersion more preferably contains 0.001 to 100 ppm, still more preferably 0.001 to 50 ppm, and particularly preferably 0.001 to 20 ppm of the fluorine-containing anionic surfactant. Moreover, the fluorine-containing anionic surfactant is preferably removed as far as possible. The aqueous fluoropolymer dispersion of the present invention is excellent in dispersion stability even when hardly containing a fluorine-containing anionic surfactant.

The aqueous fluoropolymer dispersion is commonly prepared by emulsion polymerization. The aqueous dispersion directly after polymerization contains a fluorine-containing anionic surfactant containing not more than 7 carbon atoms used in polymerization of fluoromonomers. The fluorine-containing anionic surfactant contains preferably at least 4 carbon atoms and more preferably at least 5 carbon atoms.

Examples of the fluorine-containing anionic surfactant containing not more than 7 carbon atoms include carboxylic acid surfactants and sulfonic acid surfactants. The fluorine-containing anionic surfactant is preferably at least one selected from the group consisting of carboxylic acid surfactants represented by the formulae (i), (ii), (iii), (iv), (v), (vi), and (vii).

The fluorine-containing anionic surfactant may be a carboxylic acid surfactant represented by the formula (i):

$$X-Rf^1COOM^1 \qquad (i).$$

In the formula, X represents H, F, or Cl; and $Rf^1$ represents a straight or branched C5-C6 fluoroalkylene group. For example, $Rf^1$ represents a straight or branched C6 fluoroalkylene group, and preferably a straight or branched perfluoroalkylene group. Moreover, $M^1$ represents a monovalent alkali metal, $NH_4$, or H.

Examples of the carboxylic acid surfactant represented by the formula (i) include $C_5F_{11}COOH$, $C_6F_{13}COOH$, and salts of these.

The fluorine-containing anionic surfactant may be a carboxylic acid surfactant represented by the formula (ii):

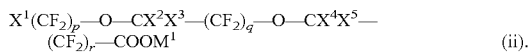
(ii)

In the formula, $X^1$, $X^2$, $X^3$, $X^4$, and $X^5$ are the same as or different from each other, and each represent H, F, or $CF_3$. Further, $M^1$ represents a monovalent alkali metal, $NH_4$, or H; p represents 1 or 2; q represents 1 or 2; and r represents 0 or 1. Examples of the fluoroether carboxylic acid represented by the formula (ii) include $CF_3OCF(CF_3)CF_2OCF(CF_3)COONH_4$, $CF_3CF_2OCF_2CF_2OCF_2COONH_4$, and $CF_3OCF_2CF_2CF_2OCHFCF_2COONH_4$.

The fluorine-containing anionic surfactant may be a carboxylic acid surfactant represented by the formula (iii):

$$X-(CF_2)_m-O-(CF(CF_3)CF_2O)_n-CF(CF_3)COOM^1 \quad (iii)$$

In the formula, X represents H, F, or Cl; m represents an integer of 1 to 4; n represents an integer of 0 or 1; and $M_1$ represents a monovalent alkali metal, $NH_4$, or H.

Preferable examples of the carboxylic acid surfactant represented by the formula (iii) include $CF_3-O-CF(CF_3)CF_2O-CF(CF_3)COOH$ and its salt.

The fluorine-containing anionic surfactant may be a carboxylic acid surfactant represented by the formula (iv):

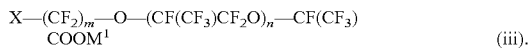
(iv)

In the formula, X, m, n, and $M^1$ are defined as above.

The fluorine-containing anionic surfactant may be a carboxylic acid surfactant represented by the formula (v):

$$X-(CF_2)_m-O-(CF(CF_3)CF_2O)_n-CH_2CF_2COOM^1 \quad (v)$$

In the formula, X, m, n, and $M^1$ are defined as above.

The fluorine-containing anionic surfactant may be a carboxylic acid surfactant represented by the formula (vi):

$$Rf_3OCF_2CF_2O(CF_2)_pCOOM^1 \quad (vi)$$

In the formula, $Rf_3$ represents an alkyl group in which part or all of hydrogen is substituted with fluorine; $M^1$ represents a monovalent alkali metal, $NH_4$, or H; and p represents 1 or 2. $Rf_3$ is preferably a C1-C3 alkyl group, and p is preferably 1. Examples of the carboxylic acid surfactant represented by the formula (vi) include $CF_3CF_2OCF_2CF_2OCF_2COONH_4$ and $CF_3CF_2OCF_2CF_2OCF_2COOH$.

The fluorine-containing anionic surfactant may be a fluoroether carboxylic acid represented by the formula (vii):

$$Rf^4OCHFCF_2COOM^1 \quad (vii)$$

In the formula, $Rf^4$ represents a straight aliphatic group or a straight aliphatic group having at least one oxygen atom inserted thereinto, in which part or all of hydrogen is substituted with fluorine; and $M^1$ represents a monovalent alkali metal, $NH_4$, or H. $Rf^4$ is preferably a C1-C4 aliphatic group or a C1-C4 aliphatic group having at least one oxygen atom inserted thereinto. Examples of the carboxylic acid surfactant represented by the formula (vii) include $CF_3OCF_2CF_2CF_2OCHFCF_2COONH_4$ and $CF_3OCF_2CF_2CF_2OCHFCF_2COOH$.

The aqueous fluoropolymer dispersion of the present invention preferably contains an aqueous medium. The aqueous medium is not particularly limited, as long as it is a water-containing liquid. The aqueous medium may contain, in addition to water, at least one selected from fluorine free organic solvents such as alcohols, ethers, ketones, or paraffin waxes; and fluorine-containing organic solvents.

Also, the aqueous fluoropolymer dispersion of the present invention preferably contains an alkali compound. Examples of the alkali compound include ammonia, sodium hydroxide, and calcium hydrate. The alkali compound is preferably ammonia.

The aqueous fluoropolymer dispersion of the present invention preferably has a pH of 7 to 10 at 25° C. The pH is more preferably 8 to 10, and still more preferably 9 to 10 at 25° C. Particularly preferably, the aqueous fluoropolymer dispersion (adjusted to a pH of 8 to 10) of the present invention has a pH of 7 to 10 after storage at 30° C. for 21 days.

With regard to the aqueous fluoropolymer dispersion of the present invention, a difference (A–B) is 1.5 or less in an absolute value, where A represents the pH after pH adjustment and is 8 or more, and B represents the pH after storage at 30° C. for 30 days. The difference (A–B) is more preferably 1 or less in an absolute value. The difference (A–B) is still more preferably less than 1.0, and particularly preferably less than 0.6. A conventional aqueous dispersion adjusted to a pH of 8 or more has a significant pH decrease after standing for 30 days. In contrast, a pH change is hardly observed in the fluoropolymer of the present invention.

The aqueous fluoropolymer dispersion of the present invention is produced, for example, by a method including the steps of: (1) emulsion polymerizing a fluoromonomer in an aqueous medium in the presence of a fluorine-containing anionic surfactant containing not more than 7 carbon atoms; (2) removing the fluorine-containing anionic surfactant from the aqueous dispersion resulting from the step (1) by adding a fluorine free surfactant; (3) adding at least one organic electrolyte selected from the group consisting of hydroxy monocarboxylic acids, hydroxy dicarboxylic acids, tricarboxylic acids, and amino acids, to the aqueous dispersion resulting from the step (2); and (4) adjusting the pH of the aqueous dispersion to 8 to 10. The above method is also one aspect of the present invention. The method may include a step of concentrating the aqueous dispersion. The step (2) is also preferably a step of removing the fluorine-containing anionic surfactant and concentrating the aqueous dispersion.

When the aqueous dispersion resulting from the step (2) has a pH of 8 or more and less than 9, an organic electrolyte is added in an amount of preferably 7 to 100 mmol and more preferably 10 to 30 mmol for 1 g of the fluoropolymer.

When the aqueous dispersion resulting from the step (2) has a pH of 9 to 10, an organic electrolyte is added in an amount of preferably 0.2 to 1.0 mmol and more preferably 0.3 to 0.6 mmol for 1 g of the fluoropolymer.

Removal of the fluorine-containing anionic surfactant and concentration of the aqueous dispersion may be carried out by a known method such as concentration by phase separation, an ion-exchange resin method, electric concentration, or ultrafiltration. After removal and concentration, a fluorine free surfactant may be added to the aqueous dispersion, or the concentration of the fluoropolymer may be adjusted. The pH adjustment of the aqueous dispersion may be carried out by addition of an alkali compound such as ammonia, sodium hydroxide, or calcium hydrate.

The aqueous fluoropolymer dispersion of the present invention is directly or after addition of various additives, processed into coatings, cast films, impregnates, or the like. The dispersion is optionally diluted or mixed with another dispersion or compound.

Applications of the aqueous fluoropolymer dispersion of the present invention include coating materials for cooking utensils such as linings of ovens or ice trays, electric cables, pipes, ship bottoms, high-frequency printed circuits, conveyor belts, and iron sole plates; fibrous base materials, woven and non-woven fabrics, and sliding members such as fuel valves or bearings of vehicles. The fibrous base materials are not particularly limited, and may be processed into, for example, impregnates including glass fiber, carbon fiber, or alamido fiber (e.g., Kevlar (registered trade mark) fiber) as a material to be impregnated. Also, the aqueous dispersion may be used as a binder for an active substance of batteries. The aqueous fluoropolymer dispersion may be processed by a conventionally known method.

A coating composition including the above aqueous fluoropolymer dispersion is also one aspect of the present invention.

A binding agent for batteries including the above aqueous fluoropolymer dispersion is also one aspect of the present invention. The binding agent for batteries including the above aqueous fluoropolymer dispersion can be used in mixture with water, an active substance, and a conduction aid. The resulting mixture may be fired to be formed into an electrode. The batteries may be primary or secondary batteries.

Many of the above applications require a firing step. If a conventional aqueous dispersion containing an inorganic electrolyte is used for applications requiring a firing step, residues are left on the surface or the inside of the base material after firing. Such residues may cause an unintended chemical reaction with the firing target, coloring, odors, or the like. In contrast, the aqueous fluoropolymer dispersion of the present invention contains an organic electrolyte, and the organic electrolyte is decomposed or evaporated by firing, which hardly causes above problems.

EXAMPLES

The present invention is described with reference to examples. The present invention is not limited to the examples.

Numerical values in examples were determined by the following methods.

(1) Fluoropolymer Concentration (P)

An amount of about 1 g (X g) of a test sample was placed in an aluminum cup with a diameter of 5 cm. The test sample was dried at 100° C. for one hour and then at 300° C. for one hour. Based on the weight (Z g) of the heating residue, the fluoropolymer concentration was calculated using the equation:

$$P = Z/X \times 100(\%).$$

(2) Amount of the Fluorine-Containing Anionic Surfactant

To the aqueous fluoropolymer dispersion, an equal amount of methanol was added, and a 5% ammonium carbonate aqueous solution was added until the dispersion was coagulated. After Soxhlet extraction thereof, high performance liquid chromatography (HPLC) was carried out under the conditions mentioned below. Thus, the amount of the fluorine-containing anionic surfactant was obtained. In calculation of the amount of the fluorine-containing anionic surfactant, a calibration curve was used, which was obtained by HPLC measurement on an aqueous fluoropolymer dispersion containing a known amount of the fluorine-containing anionic surfactant using the above eluate and conditions.

(Measurement Conditions)
Column: ODS-120T (4.69×250 mm, product of TOSO CORPORATION)
Developing solution: acetonitrile/0.6% perchloric acid aqueous solution=1/1 (vol/vol %)
Sample volume: 20 μL
Flow rate: 1.0 ml/min.
Detection wavelength: UV 210 nm
Column temperature: 40° C.

(3) Concentration (N) of the Fluorine Free Nonionic Surfactant

An amount of about 1 g of a test sample was placed in an aluminum cup having a diameter of 5 cm and heated. Based on the heating residue (Y g) resulting from heating at 100° C. for one hour, and the heating residue (Z g) resulting from further heating of the heating residue (Y g) at 300° C. for one hour, the concentration was calculated using the equation:

$$N = [(Y-Z)/Z] \times 100(\%).$$

(4) pH

The pH was measured at 25° C. in conformity with JIS K6893.

(5) Degree of Water Phase Separation

The aqueous dispersion was allowed to stand still in a cylindrical clear glass vessel at a predetermined temperature. When the dispersion was separated into a phase (supernatant phase) containing substantially no fluororesin and a concentrated phase, the height (X cm) of the whole aqueous dispersion and the height (Y cm) of the concentrated phase were measured. Based on the measurement values, the degree of water phase separation (Z) was calculated using the equation: $Z = [Y/X] \times 100(\%)$. As the numerical value is closer to 100, the dispersion stability of the aqueous dispersion is more favorable.

Example 1

(1) Concentration by Phase Separation

To 1 kg of an aqueous dispersion (the concentration of a fluorine-containing anionic surfactant having a solid content of 23% by mass and containing not more than 7 carbon atoms was 1000 ppm relative to the moisture) containing a tetrafluoroethylene/hexafluoropropylene copolymer (FEP), a fluorine free nonionic surfactant that was polyoxyethylene alkyl ether (trade name: LEOCOL TD90, product of LION CORPORATION) was added at room temperature in an amount corresponding to 21% by mass relative to the FEP. The resulting mixture was allowed to stand still for one night at 65° C., so that the mixture was separated into two phases including a phase (supernatant phase) containing substantially no FEP and a concentrated phase. The concentrated phase had a pH of 2.0. The supernatant phase was removed for recovery of the concentrated phase. In the resulting aqueous dispersion, the solid content concentration of the FEP was 62% by mass and the fluorine free nonionic surfactant concentration was 6.0% by mass relative to the FEP.

(2) Adjustment

To the aqueous dispersion resulting from the operation (1), water and LEOCOL TD90D were added such that the solid content concentration of FEP was 53.5% by mass and the fluorine free nonionic surfactant concentration was 7.5% by mass relative to the FEP. The concentration of the fluorine-containing anionic surfactant containing not more than 7 carbon atoms was 800 ppm relative to the polymer solids. Then, citric acid in an amount corresponding to 100 mmol for 1 g of the FEP was added. The mixture was stirred to give a uniform solution. A 28% aqueous solution of ammonia was added to adjust the pH of the aqueous dispersion to 8.8.

(3) Storage Stability Test

The aqueous dispersion resulting from the operation (2) was allowed to stand still at a temperature and for a period of time as shown in Table 1. Then, the pH of the aqueous dispersion was measured. A change in the pH was +0.1.

Example 2

An aqueous dispersion was prepared in the same manner as in Example 1 except that the amount of citric acid was changed to 10 mmol for 1 g of FEP. The results are shown in Table 1.

Example 3

An aqueous dispersion was prepared in the same manner as in Example 1 except that malic acid was used instead of citric acid. The results are shown in Table 1.

Example 4

An aqueous dispersion was prepared in the same manner as in Example 3 except that the amount of malic acid was changed to 10 mmol for 1 g of FEP. The results are shown in Table 1.

Example 5

An aqueous dispersion was prepared in the same manner as in Example 1 except that glycine was used instead of citric acid. The results are shown in Table 1.

Example 6

An aqueous dispersion was prepared in the same manner as in Example 5 except that the amount of glycine was changed to 10 mmol for 1 g of FEP. The results are shown in Table 1.

Comparative Examples 1 to 2

Aqueous dispersions were each prepared in the same manner as in Example 1 except that no organic electrolyte was added or the kind and amount of the organic electrolyte were changed as shown in Table 1. The results are shown in Table 1.

Example 7

An aqueous dispersion having a pH of 9.8 was prepared in the same manner as in Example 1 except the following. To the polytetrafluoroethylene (PTFE)-containing aqueous dispersion (solid content: 61% by mass, the concentration of polyoxyethylene alkyl ether (trade name: LEOCOL TD90, product of LION CORPORATION) was 6.0% by mass relative to PTFE, the concentration of the fluorine-containing anionic surfactant containing not more than 7 carbon atoms was 1 ppm relative to PTFE), citric acid was added in an amount of 1.5 mmol for 1 g of the PTFE. The results are shown in Table 2.

Examples 8 to 9

Aqueous dispersions were each prepared in the same manner as in Example 7 except that the amount of citric acid was changed as shown in Table 2. The results are shown in Table 2.

Examples 10 to 12

Aqueous dispersions were prepared in the same manner as in Examples 7 to 9, respectively, except that lactic acid was used instead of citric acid. The results are shown in Table 2.

Comparative Example 3

An aqueous dispersion was prepared in the same manner as in Example 7 except that no organic electrolyte was added. The results are shown in Table 2.

Comparative Example 4

An aqueous dispersion was prepared in the same manner as in Example 9 except that ammonium sulfate was used instead of citric acid. The results are shown in Table 2.

TABLE 1

| | Example 1 | Example 2 | Example 3 | Example 4 | Example 5 | Example 6 | Comparative Example 1 | Comparative Example 2 |
|---|---|---|---|---|---|---|---|---|
| Fluoropolymer | FEP | FEP | FEP | FEP | FEP | FEP | FEP | FEP |
| Concentration of fluorine-containing anionic surfactant (ppm) | 800 | 800 | 800 | 800 | 800 | 800 | 800 | 800 |
| Organic electrolyte | Citric acid | Citric acid | Malic acid | Malic acid | Glycine | Glycine | Not added | Ammonium sulfate |
| Amount of organic electrolyte (mmol/g) | 100 | 10 | 100 | 10 | 100 | 10 | — | 10 |
| pH at the start of storage stability test | 8.8 | 8.8 | 8.8 | 8.8 | 8.8 | 8.8 | 8.8 | 8.8 |
| pH after storage at 40° C. for 6 days | 8.9 | 8.6 | 8.4 | 8.3 | 8.5 | 8.2 | 7.8 | 8.2 |
| Change in pH | +0.1 | −0.2 | −0.4 | −0.5 | −0.3 | −0.5 | −1.0 | −0.6 |
| Degree of water phase separation after test (%) | 80 | 93 | 85 | 94 | 85 | 95 | 98 | 97 |

TABLE 2

| | Example 7 | Example 8 | Example 9 | Example 10 | Example 11 | Example 12 | Comparative Example 3 | Comparative Example 4 |
|---|---|---|---|---|---|---|---|---|
| Fluoropolymer | PTFE | PTFE | PTFE | PTFE | PTFE | PTFE | PTFE | PTFE |
| Concentration of fluorine-containing anionic surfactant (ppm) | 1 | 1 | 1 | 1 | 1 | 1 | 1 | 1 |
| Organic electrolyte | Citric acid | Citric acid | Citric acid | Lactic acid | Lactic acid | Lactic acid | Not added | Ammonium sulfate |
| Amount of organic electrolyte (mmol/g) | 1.5 | 0.6 | 0.3 | 1.5 | 0.6 | 0.3 | — | 0.3 |
| pH at the start of storage stability test | 9.8 | 9.8 | 9.8 | 9.8 | 9.8 | 9.8 | 9.8 | 9.8 |

TABLE 2-continued

| | Example 7 | Example 8 | Example 9 | Example 10 | Example 11 | Example 12 | Comparative Example 3 | Comparative Example 4 |
|---|---|---|---|---|---|---|---|---|
| pH after storage at 30° C. for 13 weeks | 9.1 | 9.1 | 8.6 | 8.8 | 8.6 | 8.3 | 5.5 | 6.1 |
| Change in pH | −0.7 | −0.7 | −1.2 | −1.0 | −1.2 | −1.5 | −4.3 | −3.7 |
| Degree of water phase separation after test (%) | 75 | 94 | 93 | 82 | 95 | 97 | 97 | 93 |

INDUSTRIAL APPLICABILITY

The aqueous dispersion of the present invention is favorably used as a coating composition, an impregnation material, and a battery material.

The invention claimed is:

1. An aqueous fluoropolymer dispersion comprising:
a fluoropolymer;
a fluorine free surfactant;
at least one organic electrolyte selected from the group consisting of hydroxy monocarboxylic acids, hydroxy dicarboxylic acids, tricarboxylic acids, and amino acids; and
a fluorine-containing anionic surfactant containing not more than 7 carbon atoms,
wherein the amount of the organic electrolyte is 0.1 to 100 mmol for 1 g of the fluoropolymer.

2. The aqueous fluoropolymer dispersion according to claim 1,
wherein the organic electrolyte is at least one selected from the group consisting of citric acid, isocitric acid, and lactic acid.

3. The aqueous fluoropolymer dispersion according to claim 1,
wherein the amount of the organic electrolyte is 0.1 to 10 mmol for 1 g of the fluoropolymer.

4. The aqueous fluoropolymer dispersion according to claim 1,
wherein the concentration of the fluorine-containing anionic surfactant is 0.001 to 2000 ppm based on the solid content mass of the fluoropolymer.

5. The aqueous fluoropolymer dispersion according to claim 1,
wherein the concentration of the fluorine-containing anionic surfactant is 0.001 to 50 ppm based on the solid content mass of the fluoropolymer.

6. The aqueous fluoropolymer dispersion according to claim 1,
wherein the fluoropolymer has a solid content concentration of 35 to 75% by mass.

7. The aqueous fluoropolymer dispersion according to claim 1,
wherein the fluoropolymer is at least one selected from the group consisting of polytetrafluoroethylene and tetrafluoroethylene/hexafluoropropylene copolymers.

8. The aqueous fluoropolymer dispersion according to claim 1,
wherein the fluorine free surfactant is a fluorine free nonionic surfactant.

9. The aqueous fluoropolymer dispersion according to claim 1,
wherein the concentration of the fluorine free surfactant is 0.1 to 30% by mass based on the solid content mass of the fluoropolymer.

10. The aqueous fluoropolymer dispersion according to claim 1,
wherein a difference (A−B) is 1.5 or less in an absolute value, where A represents the pH after pH adjustment and is 8 or more, and B represents the pH after storage at 30° C. for 30 days.

11. A coating composition, comprising
the aqueous fluoropolymer dispersion according to claim 1.

12. A binding agent for a battery, comprising
the aqueous fluoropolymer dispersion according to claim 1.

13. A method for producing an aqueous fluoropolymer dispersion, comprising the steps of:
(1) emulsion polymerizing a fluoromonomer in an aqueous medium in the presence of a fluorine-containing anionic surfactant containing not more than 7 carbon atoms;
(2) removing the fluorine-containing anionic surfactant from the aqueous dispersion resulting from the step (1) by adding a fluorine free surfactant;
(3) adding at least one organic electrolyte selected from the group consisting of hydroxy monocarboxylic acids, hydroxy dicarboxylic acids, tricarboxylic acids, and amino acids, to the aqueous dispersion resulting from the step (2); and
(4) adjusting the pH of the aqueous dispersion to 8 to 10,
wherein the amount of the organic electrolyte is 0.1 to 100 mmol for 1 g of the fluoropolymer.

14. The method according to claim 13,
wherein
the pH of the aqueous dispersion is adjusted to 9 to 10 in the step (4).

* * * * *